US012673672B2

(12) United States Patent
Ho

(10) Patent No.: US 12,673,672 B2
(45) Date of Patent: Jul. 7, 2026

(54) VEHICLE FOR PREDICTING COLLISION AND OPERATING METHOD THEREOF

(71) Applicants: HYUNDAI MOTOR COMPANY, Seoul (KR); KIA CORPORATION, Seoul (KR)

(72) Inventor: Shin Jang Ho, Yonginsi (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 231 days.

(21) Appl. No.: 18/199,412

(22) Filed: May 19, 2023

(65) Prior Publication Data

US 2023/0373476 A1      Nov. 23, 2023

(30) Foreign Application Priority Data

May 19, 2022     (KR) ........................ 10-2022-0061418

(51) Int. Cl.
*B60W 30/095*      (2012.01)
*B60W 50/14*      (2020.01)

(52) U.S. Cl.
CPC ........ *B60W 30/0956* (2013.01); *B60W 50/14* (2013.01); *B60W 2050/146* (2013.01); *B60W 2554/4041* (2020.02); *B60W 2554/802* (2020.02); *B60W 2554/804* (2020.02)

(58) Field of Classification Search
None
See application file for complete search history.

(56) References Cited

U.S. PATENT DOCUMENTS

| | | | | |
|---|---|---|---|---|
| 11,858,529 B1* | 1/2024 | Costantino | ............ | B60W 40/02 |
| 2019/0143968 A1* | 5/2019 | Song | ........................ | G02B 7/02 |
| 2020/0331465 A1* | 10/2020 | Herman | ................ | G08G 1/166 |
| 2021/0155268 A1* | 5/2021 | Oba | ........................ | B60K 35/25 |
| 2021/0197720 A1* | 7/2021 | Houston | .............. | G06V 10/764 |
| 2021/0354729 A1* | 11/2021 | Ng | .................... | B60W 30/0956 |

FOREIGN PATENT DOCUMENTS

| | | | | | |
|---|---|---|---|---|---|
| JP | 4858761 B2 | * | 1/2012 | | |
| KR | 20190080885 A | * | 7/2019 | ...... | B60W 60/00274 |
| WO | WO-2021040060 A1 | * | 3/2021 | ........... | B60W 40/12 |
| WO | WO-2021116752 A1 | * | 6/2021 | ........... | B60W 40/12 |

* cited by examiner

*Primary Examiner* — Peter D Nolan
*Assistant Examiner* — Matthew Cobb
(74) *Attorney, Agent, or Firm* — Lempia Summerfield Katz LLC

(57)      ABSTRACT

A vehicle includes: a plurality of sensors configured to obtain state information on a nearby vehicle; and a processor that is operatively connected to the plurality of sensors. The processor is configured to: determine a degree of risk of collision between the vehicle and the nearby vehicle based on the state information on the nearby vehicle; generate a top view image based on at least one of the state information or the degree of risk of collision; and determine a collision mode which indicates whether the vehicle collides with at least on of the nearby vehicle or a predicted collision portion through an artificial neural network model using the top view image as an input.

18 Claims, 12 Drawing Sheets

GRID IMAGE  (501)        TOP VIEW IMAGE (511)

| SBEV DISTINCTION | Accuracy(%) | FP (%) |
|---|---|---|
| GRID IMAGE | 78.3 | 18.8 |
| TOP VIEW IMAGE | 91.6 | 4.8 |

START

S1010 — COLLECT STATE INFORMATION OF NEARBY VEHICLE

S1020 — CALCULATE DEGREE OF COLLISION RISK

S1030 — GENERATE TOP VIEW IMAGE ON THE BASIS OF STATE INFORMATION AND DEGREE OF COLLISION RISK

S1040 — PREDICT COLLISION MODE BY USING TOP VIEW IMAGE

END

FIG. 13

VEHICLE FOR PREDICTING COLLISION AND OPERATING METHOD THEREOF

CROSS-REFERENCE TO RELATED APPLICATIONS

The present application claims the benefit of and priority to Korea Patent Application No. 10-2022-0061418, filed May 19, 2022, the entire contents of which are incorporated herein for all purposes by this reference.

FIELD

The present disclosure relates to a vehicle for predicting collision and an operating method thereof.

BACKGROUND

The statements in this section merely provide background information related to the present disclosure and may not constitute prior art.

Recently, advanced driver assistance systems (ADAS) are being developed to assist drivers in driving vehicles. The ADAS has multiple sub-classifications of technologies and provides convenience to the drivers. Such ADAS is also called autonomous driving or automated driving system (ADS).

A vehicle predicts a collision with a nearby vehicle and/or a pedestrian for safety while performing autonomous driving. For example, in the past, it is predicted whether a collision with a nearby vehicle and/or a pedestrian will occur based on sensing information obtained from a sensor while the vehicle performs autonomous driving. However, when the vehicle only predicts whether a collision will occur, it may be difficult to deal more flexibly with various collision situations in the case of an imminent collision.

SUMMARY

The present disclosure proposes a device for predicting a collision with a nearby vehicle and/or a pedestrian during autonomous driving and an operating method thereof.

Various embodiments of the present disclosure propose a device for determining whether an autonomous driving vehicle collides with a nearby vehicle and/or a pedestrian. Furthermore, various embodiments of the present disclosure propose a device for determining a collision mode that indicates a predicted collision portion and an operating method thereof.

In one embodiment of the present disclosure, a vehicle for predicting collision includes a plurality of sensors configured to obtain state information on a nearby vehicle and a processor that is operatively connected to the plurality of sensors. The processor is configured to determine a degree of risk of collision between the vehicle and the nearby vehicle based on the state information on the nearby vehicle, and generate a top view image based on at least one of the state information and the degree of risk of collision. The processor is further configured to determine a collision mode which indicates at least one of whether the vehicle collides with the nearby vehicle and a predicted collision portion through an artificial neural network model using the top view image as an input.

The top view image represents at least one of a moving path of the nearby vehicle, a position of the nearby vehicle, an angle of the nearby vehicle, a position of the vehicle, an angle of the vehicle, and the degree of collision risk between the vehicle and the nearby vehicle.

The degree of collision risk between the vehicle and the nearby vehicle includes at least one of a longitudinal collision risk index or a lateral collision risk index.

The processor is configured to determine the longitudinal collision risk index based on a time to collision between the vehicle and the nearby vehicle and a warning index, and determines the lateral collision risk index based on the longitudinal collision risk index and a time to lane crossing. The time to collision is determined based on a longitudinal distance between the vehicle and the nearby vehicle and a relative longitudinal speed of the nearby vehicle. The warning index is determined based on a distance between the vehicle and a nearby vehicle, a moving distance until the vehicle comes to a stop when the vehicle performs a uniformly accelerated motion at a maximum deceleration, and a reaction time of a driver. The time to lane crossing is determined based on a relative speed and a relative lateral position of the nearby vehicle.

The processor is configured to check whether the plurality of sensors detect the same nearby vehicle, and when the plurality of sensors detect the same nearby vehicle, the processor is configured to combine pieces of the state information obtained from the plurality of sensors and manage the combined information as state information of one nearby vehicle.

The processor is configured to control the nearby vehicle to be represented within the top view image in grayscale, which corresponds to the degree of collision risk.

The processor is configured to check whether the nearby vehicle is positioned within a region of interest. When the nearby vehicle is positioned within the region of interest, the processor is configured to generate the top view image and determine the collision mode.

The artificial neural network model is a pre-trained convolutional neural network (CNN) model that receives the top view image and determines the collision mode for the nearby vehicle.

The state information includes at least one of a position, an angle, a size, a shape, a distance, and a relative speed of the nearby vehicle.

In another embodiment of the present disclosure, a method of predicting collision for a vehicle includes: obtaining state information on a nearby vehicle by using a plurality of sensors; determining a degree of risk of collision between the vehicle and the nearby vehicle based on the state information on the nearby vehicle; and generating a top view image based on at least one of the state information and the degree of risk of collision. The method further includes determining a collision mode through an artificial neural network model using the top view image as an input. The collision mode indicates at least one of whether the vehicle collides with the nearby vehicle and a predicted collision portion.

The top view image represents at least one of a moving path of the nearby vehicle, a position of the nearby vehicle, an angle of the nearby vehicle, a position of the vehicle, an angle of the vehicle, and the degree of collision risk between the vehicle and the nearby vehicle.

The degree of collision risk between the vehicle and the nearby vehicle includes at least one of a longitudinal collision risk index or a lateral collision risk index.

The determining the degree of risk of collision includes determining the longitudinal collision risk index based on a time to collision between the vehicle and the nearby vehicle and a warning index. The determining the degree of risk of collision further includes determining the lateral collision risk index based on the longitudinal collision risk index and a time to lane crossing. The time to collision is determined based on a longitudinal distance between the vehicle and the nearby vehicle and a relative longitudinal speed of the nearby vehicle. The warning index is determined based on a distance between the vehicle and a nearby vehicle, a moving distance until the vehicle comes to a stop when the vehicle performs a uniformly accelerated motion at a maximum deceleration, and a reaction time of a driver. The time to lane crossing is determined based on a relative speed and a relative lateral position of the nearby vehicle.

The obtaining the state information on the nearby vehicle by using the plurality of sensors includes checking whether the plurality of sensors detect the same nearby vehicle. Furthermore, when the plurality of sensors detect the same nearby vehicle, the obtaining the state information on the nearby vehicle includes combining pieces of the state information obtained from the plurality of sensors and managing the combined information as state information of one nearby vehicle.

The generating the top view image includes controlling the nearby vehicle to be represented within the top view image in grayscale which corresponds to the degree of collision risk.

The operating method further includes checking whether the nearby vehicle is positioned within a region of interest, and generating the top view image and determining the collision mode when the nearby vehicle is positioned within the region of interest.

The determining the collision mode through the artificial neural network model includes determining the collision mode through a pre-trained convolutional neural network (CNN) model that receives the top view image and determines the collision mode for the nearby vehicle.

The state information on the nearby vehicle includes at least one of a position, an angle, a size, a shape, a distance, and a relative speed of the nearby vehicle.

According to various embodiments of the present disclosure, a vehicle may generate a top view image based on an occupancy grid map by using state information of a nearby vehicle. Furthermore, the vehicle may predict whether the vehicle collides and a collision mode that indicates a predicted collision portion, through an artificial neural network model trained based on the generated image. Through this, it is possible to determine when to switch a control authority for the vehicle from an autonomous driving system to an integrated safety system in a situation where vehicle collision is expected to occur. Also, a more sophisticated collision avoidance strategy is established before the collision actually occurs, and it is possible to minimize the degree of risk of collision through cooperative control with a collision avoidance system. In addition, it is possible to actively control in advance of the time of deployment of a passive safety system such as a seat belt pre-tensioner that is a passenger restraint device, or an airbag, through the predicted collision portion. Thus, minimizing the injury of the passenger in various collision situations.

BRIEF DESCRIPTION OF THE DRAWINGS

In order that the disclosure may be well understood, there are now described various forms thereof, given by way of example, reference being made to the accompanying drawings, in which:

FIG. 13 is a view showing that the vehicle determines the collision mode through an artificial neural network model in accordance with various embodiments of the present disclosure.

DETAILED DESCRIPTION

Figure 1:
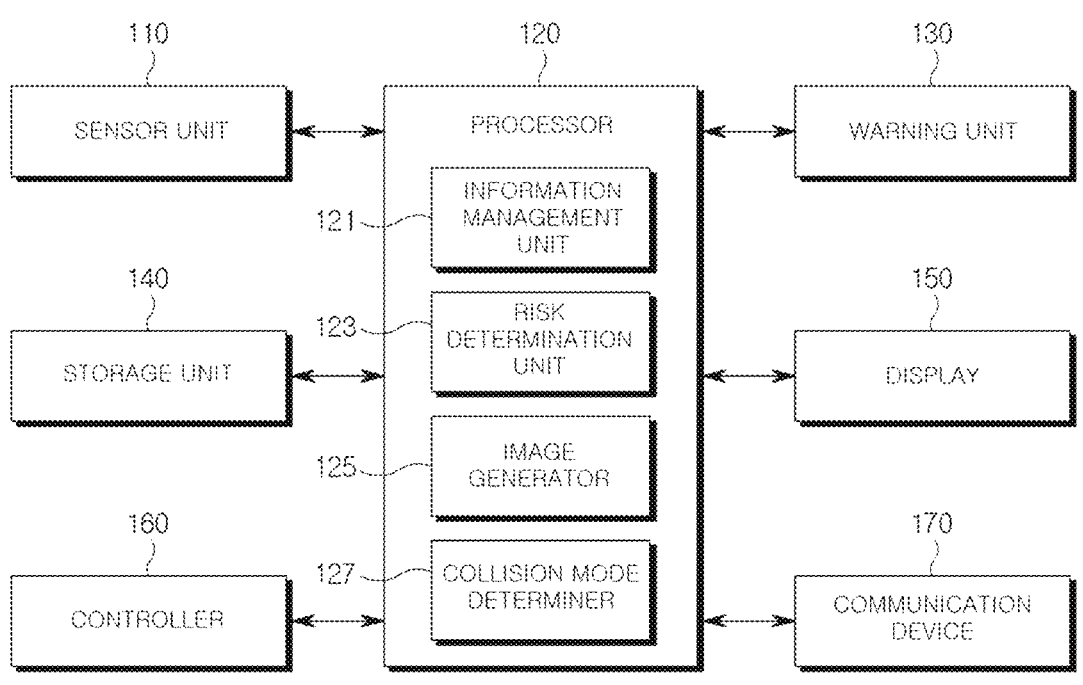
FIG. 1 is a block diagram of a vehicle according to one embodiment of the present disclosure.

Hereinafter, embodiments disclosed in this specification are described in detail with reference to the accompanying drawings. The same or similar elements are denoted by the same reference numerals irrespective of drawing numbers, and repetitive descriptions thereof are omitted.

A suffix "module" or "part" for the component, which is used in the following description, is given or mixed in consideration of only the ease of constructing the specification, and does not have any distinguishing meaning or function per se. Also, the term "module" or "part" may be software components or hardware components such as a field programmable gate array (FPGA), and an application specific integrated circuit (ASIC). The term "part" or "module" performs certain functions. However, the term "part" or "module" is not meant to be limited to software or hardware. The term "part" or "module" may be configured to be placed in an addressable storage medium or to restore one or more processors. Thus, for one example, the term "part" or "module" may include components such as software components, object-oriented software components, class components, and task components. The term "part" or "module" may further include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules."

When a component, device, element, or the like of the present disclosure is described as having a purpose or performing an operation, function, or the like, the component, device, or element should be considered herein as being "configured to" meet that purpose or to perform that operation or function.

Methods or algorithm steps described relative to some embodiments of the present disclosure may be directly implemented by hardware and software modules that are executed by a processor or may be directly implemented by a combination thereof. The software module may be resident on a random-access memory (RAM), a flash memory, a read-only memory (ROM), an erasable programmable read-only memory (EPROM), an electrically erasable programmable read-only memory (EEPROM), a resistor, a hard disk, a removable disk, a compact disc read-only memory (CD-ROM), or any other type of record medium known to those having ordinary skill in the art. A record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

Also, in the following description of an embodiment disclosed in the present specification, the detailed description of known technologies incorporated herein is omitted to avoid making the subject matter of an embodiment disclosed in the present specification unclear. Also, the accompanying drawings are provided only to easily describe an embodiment disclosed in the present specification. The technical spirit disclosed in the present specification is not limited by the accompanying drawings. All modifications, equivalents, and substitutes included in the spirit and scope of the present disclosure are understood to be included in the accompanying drawings.

While terms including ordinal numbers such as the first, the second, and the like, can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. In the case where a component is referred to as being "directly connected" or "directly accessed" to another component, it should be understood that there is no component therebetween.

Prior to the detailed description of the present disclosure, terms used in the present disclosure may be defined as follows.

A vehicle is equipped with an automated driving system (ADS) and thus can be autonomously driven. For example, the vehicle may perform at least one of steering, acceleration, deceleration, lane change, and stopping without a driver's manipulation by the ADS. The ADS may include, for example, at least one of pedestrian detection and collision mitigation system (PDCMS), lane change decision aid system (LCAS), land departure warning system (LDWS), adaptive cruise control (ACC), lane keeping assistance system (LKAS), road boundary departure prevention system (RBDPS), curve speed warning system (CSWS), forward vehicle collision warning system (FVCWS), and low speed following (LSF).

A driver is a person who uses a vehicle and is provided with a service of an autonomous driving system.

FIG. 1 is a block diagram of a vehicle according to various embodiments of the present disclosure.

Figure 2:
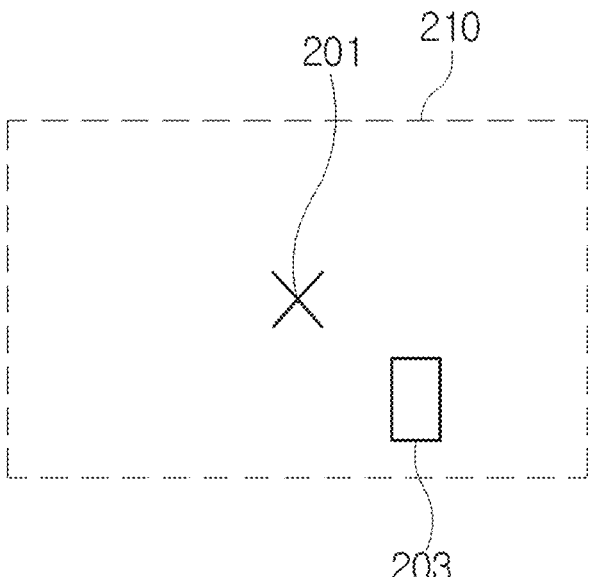
FIG. 2 is a view showing a track detected by heterogeneous sensors according to an embodiment of the present disclosure.
Figure 3:
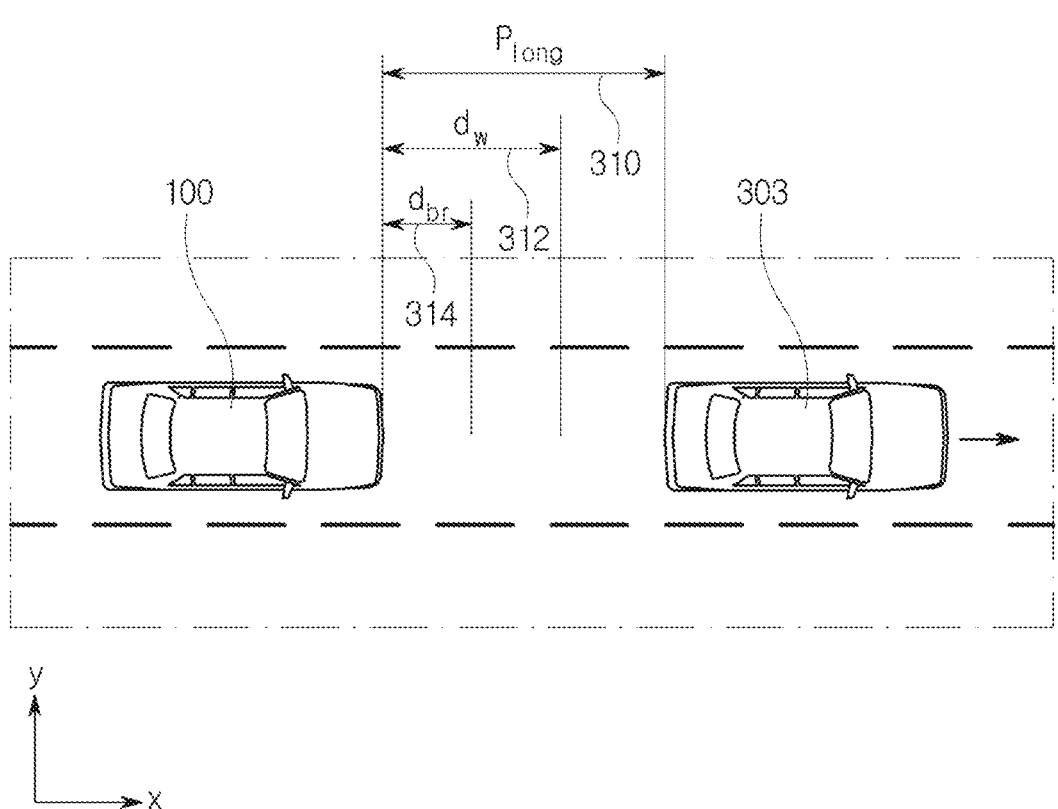
FIG. 3 is a view showing factors used to calculate a degree of collision risk in a vehicle according to an embodiment of the present disclosure.
Figure 4:
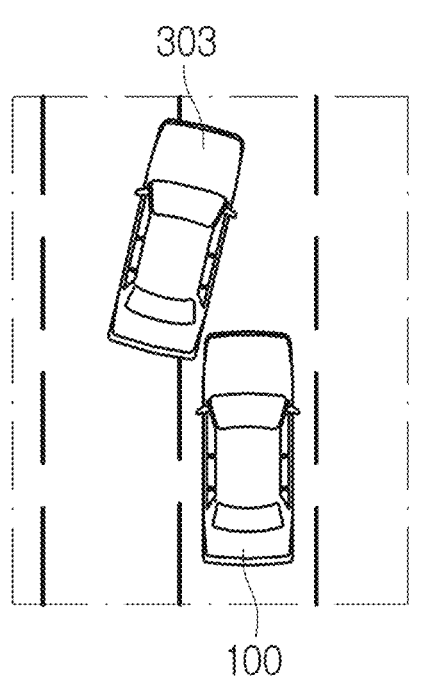
FIG. 4 is a view showing a top view image generated based on state information of nearby vehicles according to an embodiment of the present disclosure.
Figure 4:
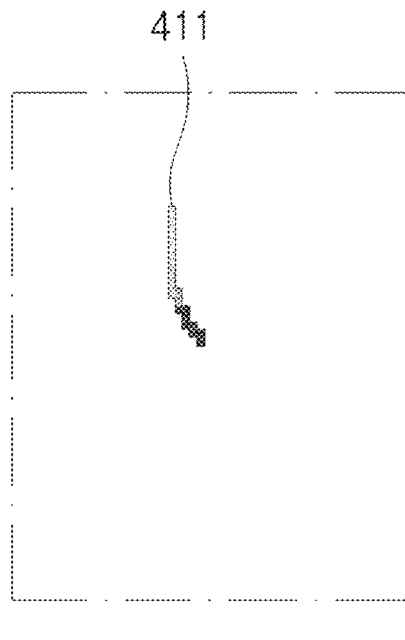
Figure 5:
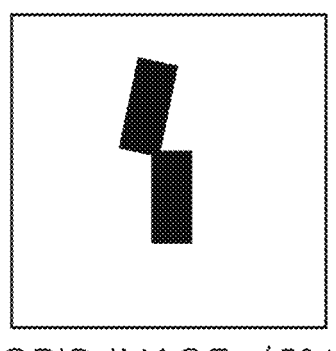
FIG. 5 is a view showing a top view image and performance of a collision mode determination model using the top view image according to various embodiments of the present document.
Figure 5:
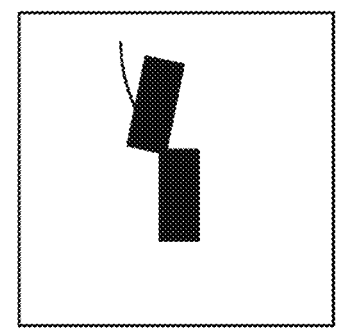
Figure 6:
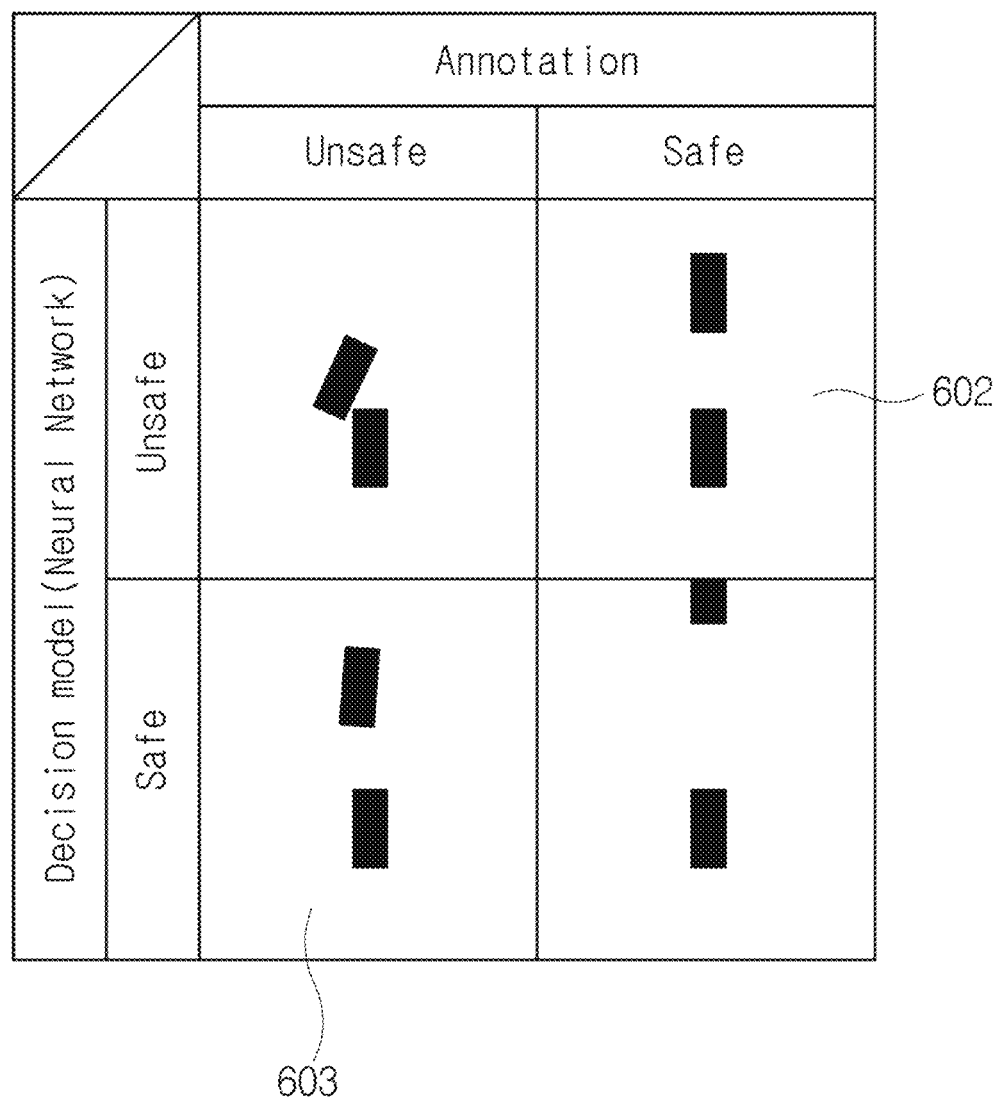
FIG. 6 is a view showing a result of determining a collision mode using a grid image according to various embodiments of the present disclosure.
Figure 7:
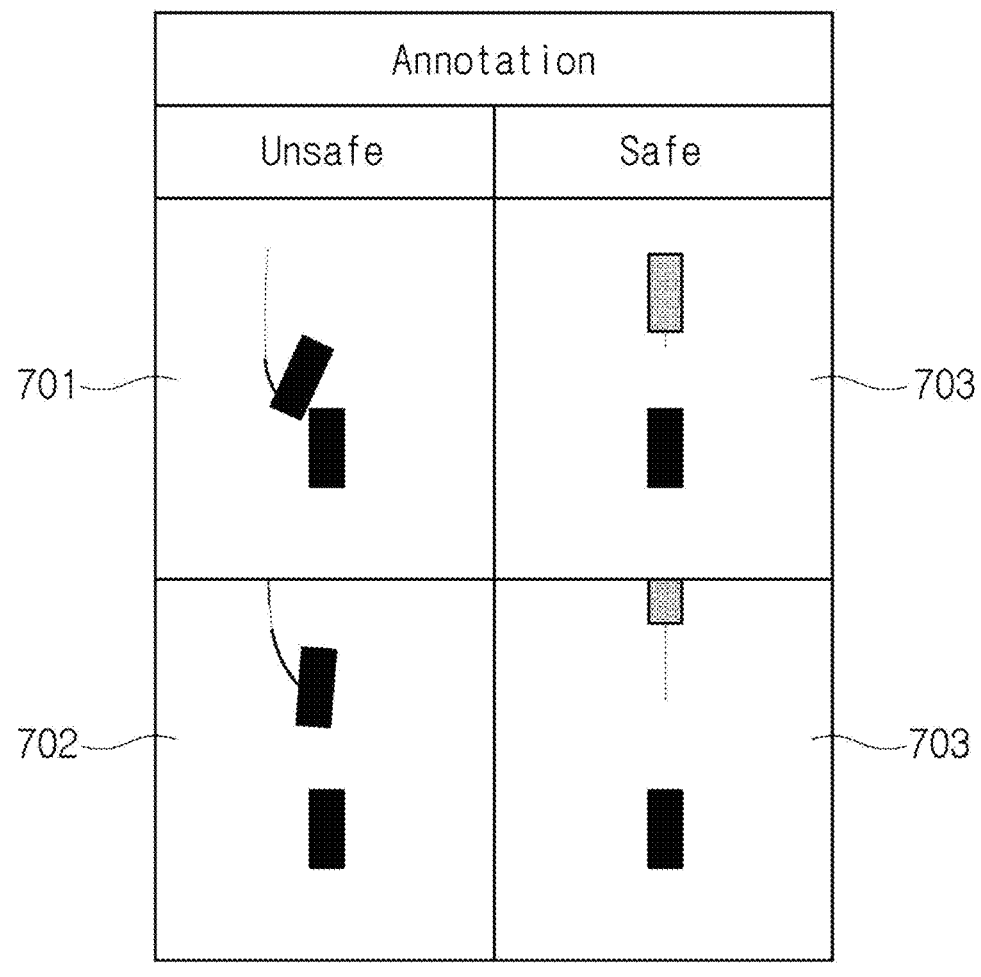
FIG. 7 is a view showing a result of determining the collision mode by using a top view image in which the degree of collision risk is reflected according to various embodiments of the present document.
Figure 8:
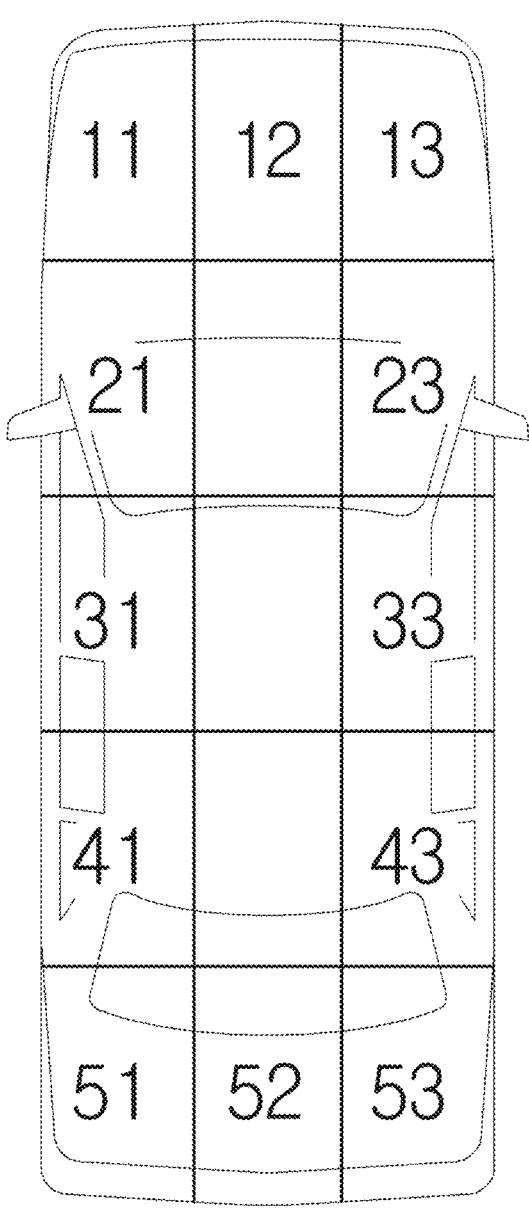
FIG. 8 is a view showing the collision mode for each predicted collision portion of a vehicle according to various embodiments of the present disclosure.
Figure 9:
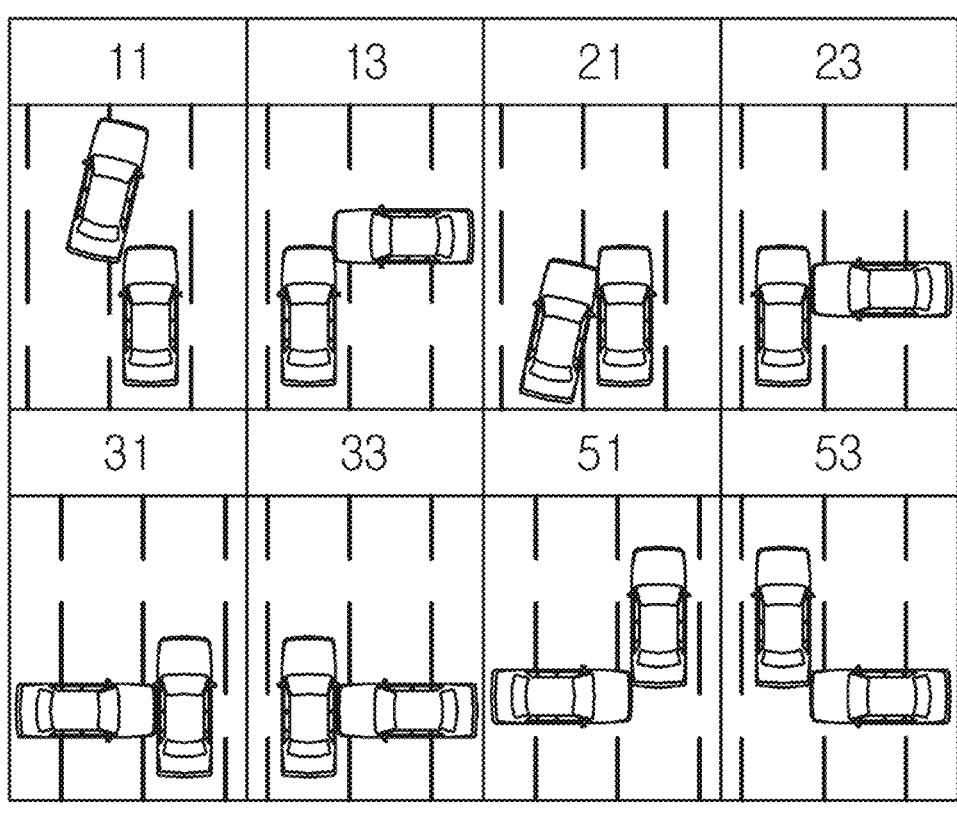
FIG. 9 is a view showing the collision mode according to a predicted collision portion between the vehicle and a nearby vehicle in accordance with various embodiments of the present disclosure.

A vehicle shown in FIG. 1 is shown as an embodiment. Each component of the electronic device may be configured with one chip, one part, or one electronic circuit or configured by combining chips, parts, and/or electronic circuits. According to an embodiment, some of the components shown in FIG. 1 may be divided into a plurality of components and may be configured with different chips, parts, or electronic circuits. Also, some components are combined and configured with one chip, one part, or one electronic circuit. According to an embodiment, some of the components shown in FIG. 1 may be omitted or components not shown may be added. At least some of the components of FIG. 1 are described with reference to FIGS. 2-9. FIG. 2 is a view showing a track detected by heterogeneous sensors according to various embodiments of the present disclosure. FIG. 3 is a view showing components used to calculate the degree of collision risk in a vehicle according to various embodiments of the present disclosure. FIG. 4 is a view showing a top view image generated based on state information of nearby vehicles according to various embodiments of the present disclosure. FIG. 5 is a view showing a top view image and performance of a collision mode determination model using the top view image according to various embodiments of the present disclosure. FIG. 6 is a view showing a result of determining a collision mode using a grid image according to various embodiments of the present disclosure. FIG. 7 is a view showing a result of determining the collision mode by using a top view image in which the degree of collision risk is reflected according to various embodiments of the present document. FIG. 8 is a view showing the collision mode for each predicted collision portion of a vehicle according to various embodiments of the present disclosure. FIG. 9 is a view showing the collision mode according to a predicted collision portion between the vehicle and a nearby vehicle in accordance with various embodiments of the present disclosure Referring to FIG. 1, a vehicle 100 may include a sensor unit 110, a processor 120, a warning unit 130, a storage unit 140, a display 150, a controller 160, and a communication device 170.

According to various embodiments, the sensor unit 110 may detect the surrounding environment of the vehicle 100 by using at least one sensor and may generate data related to the surrounding environment based on the detection result. For example, the sensor unit 110 may obtain received information on objects around the vehicle (e.g., nearby vehicles, people, objects, curbs, guard rails, lanes, obstacles, and the like) based on sensing data obtained from at least one sensor. The information on objects around the vehicle may include at least one of a position of the object, an angle of the object, a size of the object, a shape of the object, a distance from the object, and a relative speed to the object. For another example, the sensor unit 110 may measure the position of the vehicle 100 by using at least one sensor. The sensor unit 100 may include, for example, at least one of a camera, a light detection and ranging (LIDAR), a radio detection and ranging (RADAR), an ultrasonic sensor, an infrared sensor, and a position measuring sensor. The listed sensors are only examples for understanding, and the sensor of the present disclosure is not limited thereto.

According to various embodiments, the processor 120 may control the overall operation of the vehicle 100. According to an embodiment, the processor 120 may include an electrical control unit (ECU) capable of integrally controlling the components within the vehicle 100. For example, the processor 120 may include a central processing unit (CPU) or micro processing unit (MCU) capable of performing arithmetic processing.

According to various embodiments, the processor 120 may determine a collision mode that indicates whether the vehicle collides with nearby vehicles and a predicted collision portion based on the sensing data obtained through the sensor unit 110.

According to various embodiments, the processor 120 may include an information management unit 121, thereby obtaining state information of the nearby vehicle from the sensing data obtained from the sensor unit 110. The information management unit 121 of the processor 120 may check whether data sensed by different sensors included in the sensor unit 110 is for the same nearby vehicle. When the data sensed by the different sensors are for the same nearby vehicle, the information manager 121 may fuse (e.g., combine) the data sensed by the different sensors and may generate the state information of the nearby vehicle. The state information of the nearby vehicle may include information on the position and angle of the nearby vehicle.

For example, when the different sensors included in the sensor unit 110 are LIDARs and cameras, the information management unit 121, as shown in FIG. 2, may set a rectangular gating 210 centered on the position of a LIDAR track 201 and may determine whether a track 203 detected by the camera is included within the set gating. Furthermore, it is possible to check whether the LIDAR and the camera detect the same nearby vehicle. The gating 210 may be a rectangular area (or range) centered on the position of the track 201 detected by the LIDAR. When the track 203, detected by the camera, is included within the gating 210, the information management unit 121 may determine that the LIDAR and the camera are detecting the same nearby vehicle and may combine information on the track 201 detected by the LIDAR and information on the track 203 detected by the camera. Furthermore, the information management unit 121 may then manage and/or register the combined information as state information of one nearby vehicle. When the track 203, detected by the camera, is not included within the gating 210, the information management unit 121 may determine that the LIDAR and the camera are detecting different nearby vehicles and may manage and/or register the information on the track 201 detected by the LIDAR and the information on the track 203 detected by the camera as state information of the different nearby vehicles.

According to various embodiments, the processor 120 may include a risk determination unit 123, and thus, may calculate the degree of risk of collision between the vehicle (own vehicle) 100 and the nearby vehicle based on the state information of the nearby vehicle. First, the risk determination unit 123 of the processor 120 may calculate a time to collision (TTC) as shown in Equation (1).

$$TTC = \frac{x}{v_{rel}}$$ Equation (1)

In Equation (1), "TTC" may be a time to collision, "x" may be a longitudinal distance between the vehicle 100 and a nearby vehicle, and "$v_{rel}$" may be a relative longitudinal speed of the nearby vehicle.

The risk determination unit 123 may determine a warning index as shown in Equation (2).

$$x_p = \frac{p_{long} - d_{br}}{d_w - d_{br}}$$ Equation (2)

In Equation (2), "$x_p$" may be a warning index, and "$p_{long}$" may be a distance between the vehicle and a nearby vehicle. "$d_{br}$" may be a moving distance until the vehicle comes to a stop when the vehicle performs a uniformly accelerated motion at the maximum deceleration. "$d_w$" may be a stopping distance in consideration of the reaction time of the driver. For example, as shown in FIG. 3, "$p_{long}$" 310 may be a distance between the front end of the vehicle 100 and the rear end of a nearby vehicle 303, and "$d_{br}$" 314 may be a distance from a starting position of deceleration to a stopping position when the vehicle performs a uniformly accelerated motion at the maximum deceleration. "$d_w$" 312 may be the time taken from when the driver detects the need to operate to when the driver operates the brake, i.e., the stopping distance in consideration of the reaction time of the driver. The "$d_{br}$" 314 may be referred to as a breaking critical distance, and "$d_w$" 312 may be referred to as a warning critical distance.

"$d_{br}$" in Equation (2) may be calculated by Equation (3) below, and "$d_w$" may be calculated by Equation (4) below.

$$d_{br} = v_{rel} \cdot t_{brake} - \frac{v_{rel}^2}{2a_{x,max}}$$ Equation (3)

In Equation (3), "$v_{rel}$" may be a relative longitudinal speed of the nearby vehicle, and "$t_{brake}$" may be a system delay time of a braking system hardware. "$a_{x,max}$" may be a maximum longitudinal deceleration of the vehicle.

$$d_w = v_{rel} \cdot t_{thinking} + v_{rel} \cdot t_{brake} - \frac{v_{rel}^2}{2a_{x,max}}$$ Equation (4)

In Equation (4), "$v_{rel}$" may be a relative longitudinal speed of the nearby vehicle, and "$t_{thinking}$" may be a reaction time until the driver operates the brake. "$t_{brake}$" may be the system delay time of the braking system hardware, and "$a_{x,max}$" may be a maximum longitudinal deceleration of the vehicle.

According to an embodiment, when "$p_{long}$" is greater than "$d_w$", the warning index "$x_p$" of Equation (2) has a positive value. What the warning index "$x_p$" has a positive value may be that the current situation is safe.

The risk determination unit 123 may calculate a longitudinal collision risk index as shown in Equation (5) based on the warning index.

$$I_{long} = \max\left(\frac{|x_{max} - x_p|}{|x_{max} - x_{th}|}, \frac{|TTC^{-1}|}{|TTC_{th}^{-1}|}\right)$$ Equation (5)

In Equation (5), "$I_{long}$" may be the longitudinal collision risk index, and "$x_{max}$" may be the maximum value of the warning index. "$x_{th}$" is a threshold value of the warning index, and "$TTC^{-1}{}_{th}$" may be a threshold value of "$TTC^{-1}$".

The risk determination unit 123 may calculate a time to lane crossing (TLC) based on a relative lateral position and a relative speed of the nearby vehicle.

$$TLC = \frac{y}{v_y} \qquad \text{Equation (6)}$$

In Equation (6), "y" may be the relative lateral position of the nearby vehicle, and "$v_y$" may be a relative lateral speed.

After calculating the time to lane crossing (TLC), the risk determination unit 123 may calculate a lateral collision risk index "$I_{lat}$" as shown in Equation (7).

$$I_{lat} = \min(I_{long}, 1) \cdot \min\left(\frac{TLC_{th}}{TLC}, 1\right) \qquad \text{Equation (7)}$$

In Equation (7), "$I_{long}$" may be the longitudinal collision risk index, "$TLC_{th}$" may be a threshold value for the time to lane crossing. "TLC" may be the time to lane crossing.

According to an embodiment, the lateral collision risk index has a value between 0 and 1. The closer the lateral collision risk index is to 1, the higher the collision risk is.

In the above description, "$TTC^{-1}{}_{th}$" and "$TLC_{th}$" required for the calculation of the lateral collision risk index may be set based on a virtual accident data generated through a simulator. For example, "$TTC^{-1}{}_{th}$," may be set to about 0.5 and "$TLC_{th}$" may be set to about 0.5.

According to various embodiments, the processor 120 may include an image generator 125, thereby generating a top view image by using the calculated degree of risk (e.g., lateral collision risk index) and the state information of the nearby vehicle. The processor 120 may generate the top view image based on information on a current position and an angle of the nearby vehicle, information on a past location and an angle of the nearby vehicle, and the degree of risk. The top view image may be a simplified bird's eye view (SBEV) image.

According to an embodiment, when the nearby vehicle is located within a region of interest (ROI), the image generator 125 of the processor 120 may generate a top view image based on the state information and the degree of collision risk of the nearby vehicle. In order to generate a top view image, the image generator 125 may use the state information of the nearby vehicle obtained during a specified time period. The specified time period may be a time period from a past time point (t–tw) to a current time point (t). For example, the image generator 125 may generate a grid map which is divided into m×n grids based on position information included in the state information of the nearby vehicle obtained during a time period from the past time point (t–tw) to the current time point (t). A black grid of the generated grid map may indicate obstacles such as the nearby vehicles, and a white grid may indicate a space which is not occupied by the obstacle, i.e., a space in which the vehicle can move. For example, as shown on the left side of FIG. 4, when another vehicle 303 (a nearby vehicle) is present within the ROI of the vehicle 100, the image generator 125 may generate a top view image representing a moving path 411 of the vehicle 303 shown on the right side of FIG. 4 by using information on position and angle of said another vehicle 303 during a specified time period (from (t–tw) to t). The moving path 411 may indicate a change in position of the center point of the vehicle 303 according to the moving path of the vehicle 303.

According to an embodiment, the image generator 125 may generate a top view image indicating information on a current position and angle of the nearby vehicle. For example, the image generator 125 may generate a grid image 501 representing the nearby vehicle by a rectangle as shown in FIG. 5, by using the information on the position and angle of the nearby vehicle, which corresponds to the current time point.

According to an embodiment, the image generator 125 may generate a top view image that synthetically represents the moving path of the nearby vehicle and the information on a current position and angle of the nearby vehicle. For example, as shown in FIG. 5, the image generator 125 may generate a top view image 511 that synthetically represents the moving path of the nearby vehicle and the information on a current position and angle of the nearby vehicle.

According to an embodiment, the image generator 125 may normalize the degree of collision risk calculated with respect to the nearby vehicle, and may represent the nearby vehicle within the top view image in grayscale. For example, a nearby vehicle of which the degree of collision risk is calculated to be relatively low may be represented in gray, and a nearby vehicle of which the degree of collision risk is calculated to be relatively high may be represented in black. In another example, a nearby vehicle having the degree of collision risk lower than a specified critical degree of collision risk may be represented in gray, and a nearby vehicle having the degree of collision risk higher than the specified critical degree of collision risk may be represented in black. In another example, when the vehicle is represented in white within the top view image and a space which is not occupied by an obstacle is represented in black, a nearby vehicle having a high degree of collision risk may be represented in white, and a vehicle having a low degree of collision risk may be represented in gray.

The image generating unit 125, according to various embodiments of the present disclosure, generates the top view image 511. The top view image 511 synthetically represents the moving path of the nearby vehicle and the information on the current position and angle of the nearby vehicle because the accuracy of determining the collision mode by using the top view image 511 is higher than that of determining the collision mode by using the grid image 501. For example, as shown in FIG. 5, the accuracy of determining the collision mode by using the proposed top view image 511 is about 91.6%. Therefore, it can be seen that the accuracy of determining the collision mode by using the proposed top view image 511 is higher than the accuracy of about 78.3% when determining the collision mode by using the grid image 501. Also, false positive (FP) when determining the collision mode by using the proposed top view image 511 is about 4.8%. Therefore, it can be seen that the FP when determining the collision mode using the proposed top view image 511 is lower than the FP of 18.8% when determining the collision mode using the grid image 501. The FP may be an indicator that indicates a case in which a safe situation is erroneously determined as a risky situation.

For example, when using the grid image, as shown in FIG. 6, although an image 602 represents an actual safe situation, the safe situation may be erroneously determined as a risky situation by the collision mode determination model (e.g., decision model). Alternatively, although an image 603 represents an actual risky situation, the risky situation may be erroneously determined as a safe situation by the collision mode determination model. The collision mode determination model may be a pre-trained artificial neural network model.

On the other hand, when using the top view image proposed in the present disclosure, as shown in FIG. 7, an actual risky situation represented by images 701 and 702 may be determined as a risky situation by the collision mode determination model, and an actual safe situation represented by images 703 and 704 may be determined as a safe situation by the collision mode determination model.

According to various embodiments, the processor 120 includes a collision mode determiner 127, thereby determining the collision mode through the artificial neural network model using the top view image as an input. The artificial neural network model may be a pre-trained convolutional neural network (CNN) model that receives the top view image and determines the collision mode for a nearby vehicle. For example, the processor 120 may determine a collision mode that indicates whether the vehicle collides with nearby vehicles and a predicted collision portion by using the CNN model which uses the top view image as an input.

According to an embodiment, the collision mode determiner 127 may divide the vehicle into a plurality of zones in order to predict a collision portion. For example, as shown in FIG. 8, the vehicle may be divided into three zones in the horizontal direction and five zones in the vertical direction, and then numbers may be assigned to the zones respectively. For example, a two-digit number may be assigned to each zone. The first digit may be assigned a number for separating the longitudinal zones, and the second digit may be assigned a number for separating the horizontal zones.

According to an embodiment, when a collision with a nearby vehicle is predicted, the collision mode determiner 127 may check a portion predicted to collide with a nearby vehicle, and may determine the collision mode based on a number assigned to the corresponding portion. For example, as shown in FIG. 9, when a nearby vehicle is predicted to collide with a left front portion (or left front bumper) of the vehicle, the collision mode determiner 127 may determine the collision mode as 11. For another example, when a nearby vehicle is predicted to collide with the center of the right side of the vehicle, the collision mode determiner 127 may determine the collision mode as 33.

According to an embodiment, the artificial neural network model may include a convolutional layer and a pooling layer that extracts features from the input top view image, and may include a fully connected layer that outputs a final collision mode based on the extracted features. For example, the collision mode determiner 127 may extract features from the top view image by using the convolutional layer and the pooling layer. Furthermore, the collision mode determiner 127 may determine and output the collision mode by using the fully connected layer that uses the extracted features as an input. According to an embodiment, only one top view image can be used as an input of the artificial neural network model. However, a plurality of top view images, including different pieces of information, can also be used. For example, the collision mode determiner 127 may include: a first top view image representing only the moving path of the nearby vehicle; a second top view image representing the positions and angles of the nearby vehicle and the own vehicle; a third top view image representing the moving path of the nearby vehicle, the positions and angles of the nearby vehicle, the positions and angles of the nearby vehicle, the own vehicle; and/or a fourth top view image representing the moving path of the nearby vehicle, the positions and angles of the nearby vehicle, the own vehicle, and the degree of collision risk of the nearby vehicle. The collision mode determiner 127 may use the top view images as an input of the CNN.

According to various embodiments, the warning unit 130 may warn the driver of the risk of collision with a nearby vehicle under the control of the processor 120. For example, the warning unit 130 may warn the risk of collision by using a risk warning lamp or may output a warning message or a warning sound through a speaker.

According to various embodiments, the storage unit 140 may store various programs and data for the operation of the vehicle and/or the processor 120. According to an embodiment, the storage unit 140 may store various programs and data for determining the collision mode. The storage unit 140 may temporarily store data obtained or generated during the determination of the collision mode.

According to various embodiments, the display 150 may visually display information related to the vehicle 100. For example, the display 150 may provide a variety of information related to the state of the vehicle 100 to the driver of the vehicle 100 under the control of the processor 120. The variety of information related to the state of the vehicle may include at least one of information indicating whether various components included in the vehicle and/or at least one function of the vehicle are normally operated, and information indicating the driving state of the vehicle. According to an embodiment, the display 150 may display information on the collision mode under the control of the processor 120. For example, the display 150 may display information on whether a collision with a nearby vehicle is predicted and on what predicted collision portion.

According to various embodiments, the controller 160 may control at least one component of the vehicle 100 and/or the operation of at least one function of the vehicle under the control of the processor 120. The at least one function is, for example, a collision avoidance function, a collision mitigation function, a deceleration function (or a longitudinal deceleration function, a braking function), a steering function, an acceleration function (or a longitudinal acceleration function), a lane change function, a lane detection function, an obstacle recognition and distance detection function, a lateral control function, a powertrain control function, a safety zone detection function, an engine on/off, a power on/off, and a vehicle lock/unlock function. According to an embodiment, the controller 160 controls at least one component of the vehicle and/or the operation of at least one function of the vehicle under the control of the processor 120 for the purpose of autonomous driving, collision avoidance, and/or collision mitigation of the vehicle 100.

According to various embodiments, the communication device 170 may communicate with an external device of the vehicle 100. According to embodiments, the communication device 170 may receive data from the outside of the vehicle 100 or transmit data to the outside of the vehicle 100 under the control of the processor 120. For example, the communication device 170 may perform a communication by using a wireless communication protocol or a wired communication protocol.

Although the controller 160 and the processor 120 have been described as separate components in FIG. 1, as described herein, the controller 160 and the processor 120 may be integrated into one component according to various embodiments.

Figure 10:
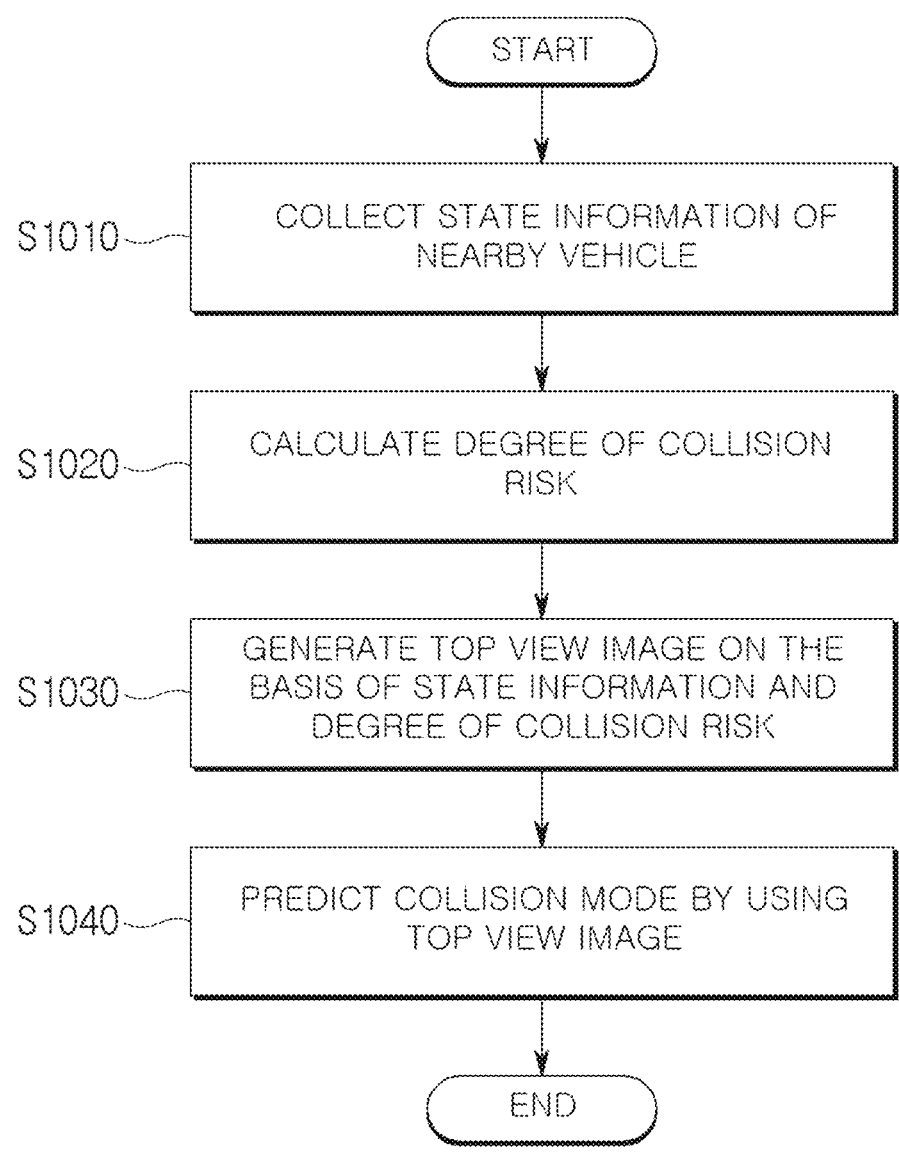
FIG. 10 is a flowchart illustrating a process of predicting the collision mode in one embodiment of the present disclosure.

FIG. 10 is a flowchart illustrating a process of predicting the collision mode in one embodiment of the present disclosure. In the following embodiment, respective operations may be sequentially performed, and may not be necessarily performed sequentially. For example, the order of the respective operations may be changed, and at least two operations may be performed in parallel. In addition, the following operations may be performed by the processor 120 and/or at least one other component (e.g., the sensor unit 110) included in the vehicle 100, or may be implemented with instructions that can be executed by the processor 120 and/or the at least one other component (e.g., the sensor unit 110).

Referring to FIG. 10, the vehicle may collect the state information of a nearby vehicle in step S1010. According to an embodiment, the vehicle may obtain information on the position and angle of the nearby vehicle by using a plurality of sensors (e.g., a camera, LIDAR, RADAR, and the like).

In step S1020, based on the state information of the nearby vehicle, the vehicle may calculate the degree of collision risk between the vehicle and the nearby vehicle. According to an embodiment, the degree of collision risk between the vehicle and the nearby vehicle may be calculated by using Equations (1)-(7) described herein.

In step S1030, based on the state information and the degree of collision risk, the vehicle may generate a top view image. According to an embodiment, the top view image may represent the moving path of the nearby vehicle, the positions and angles of the nearby vehicle and the own vehicle, and the degree of collision risk of the nearby vehicle.

In step S1040, the vehicle may predict the collision mode by using the top view image. According to an embodiment, the vehicle may input the top view image to the CNN and may obtain the collision mode from the CNN. The collision mode may include information on whether the vehicle collides with the nearby vehicle and/or the predicted collision portion.

Figure 11:
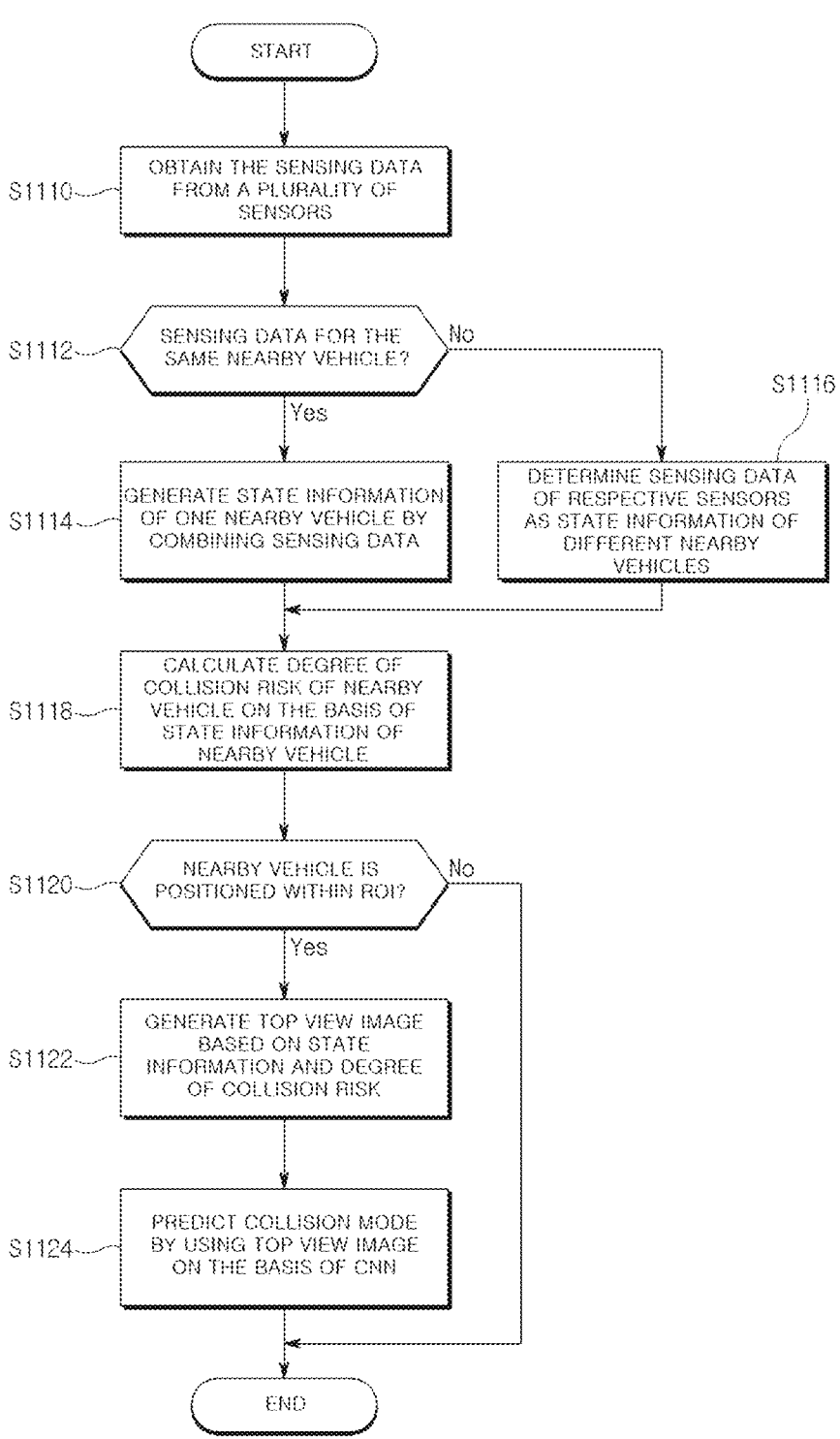
FIG. 11 is a flowchart showing detailed operations in which the vehicle predicts the collision mode according to various embodiments of the present disclosure.
Figure 12:
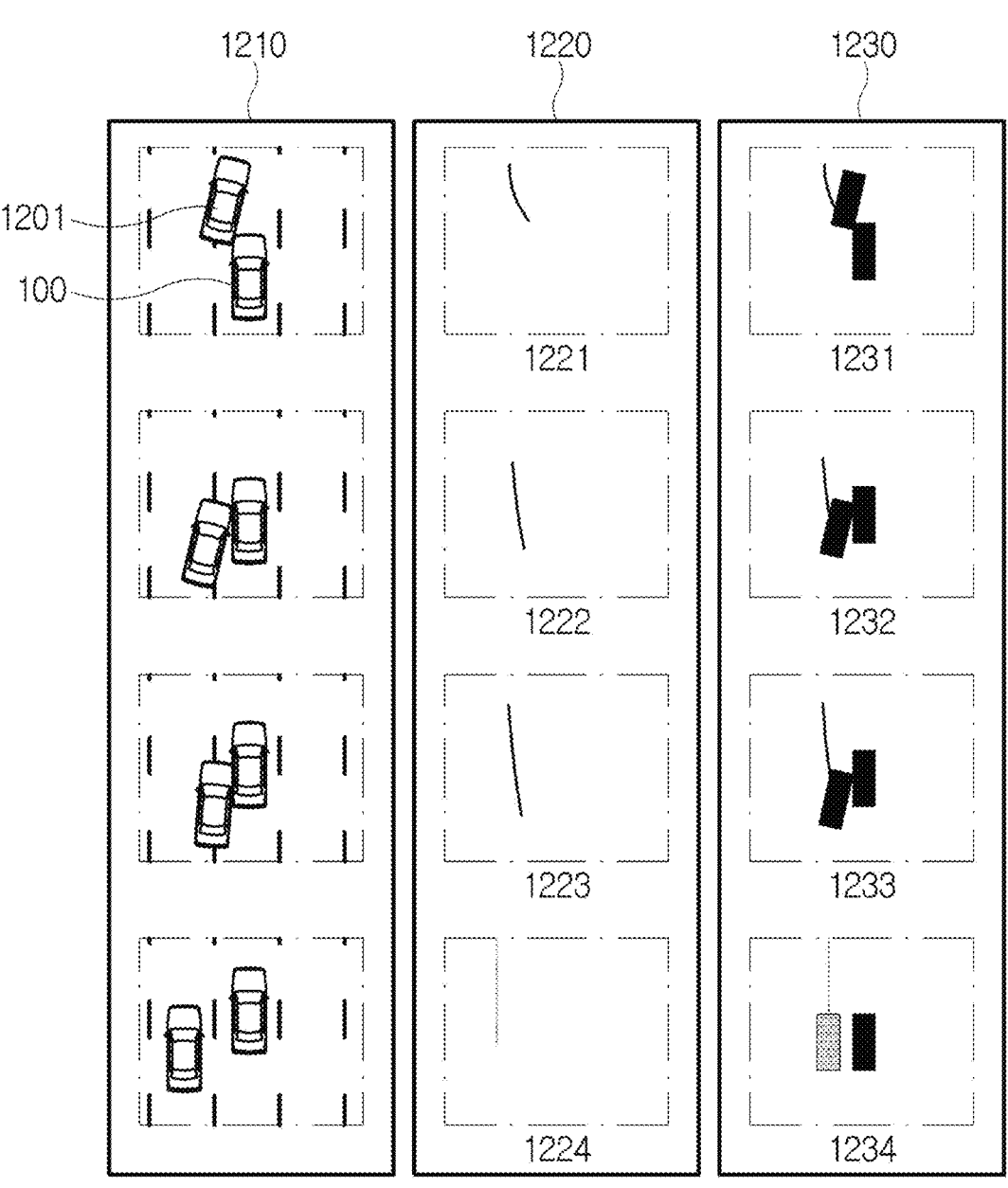
FIG. 12 is a view showing a top view image in which the degree of collision risk on nearby vehicles is reflected according to various embodiments of the present disclosure.
Figure 13:
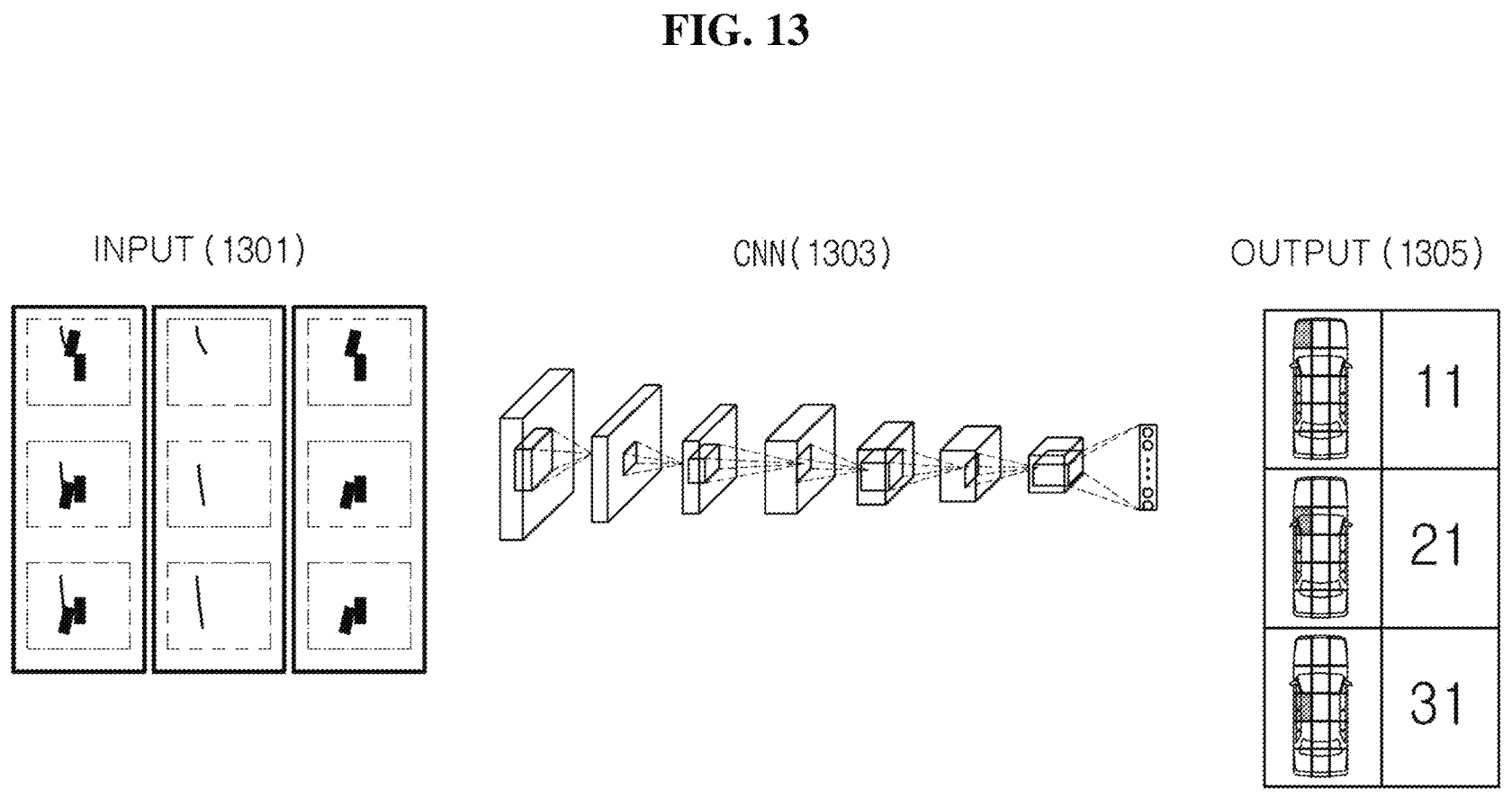

FIG. 11 is a flowchart showing detailed operations in which the vehicle predicts the collision mode according to various embodiments of the present disclosure. At least some operations of FIG. 11 may be detailed operations of FIG. 10. Hereinafter, the respective operations of FIG. 11 may be sequentially performed, and may not be necessarily performed sequentially. For example, the order of the respective operations may be changed, and at least two operations may be performed in parallel. Hereinafter, at least some operations of FIG. 11 are described with reference to FIGS. 12 and/or 13. FIG. 12 is a view showing a top view image in which the degree of collision risk on nearby vehicles is reflected according to various embodiments of the present disclosure. FIG. 13 is a view showing that the vehicle determines the collision mode through the CNN in accordance with various embodiments of the present disclosure.

Referring to FIG. 11, in step S1110, the vehicle may obtain the sensing data from a plurality of sensors. The vehicle may obtain the information on the nearby vehicle by using the plurality of sensors (e.g., a camera, LIDAR, RADAR, and the like). The information on the nearby vehicle may include, for example, at least one of the position of the nearby vehicle, the angle of the nearby vehicle, the size of the nearby vehicle, the shape of the nearby vehicle, a distance between the vehicle and the nearby vehicle, and a relative speed of the nearby vehicle to the vehicle.

In step S1112, the vehicle may determine whether the sensing data obtained from the plurality of sensors is sensing data for the same nearby vehicle. For example, the vehicle may determine whether the nearby vehicle sensed by a first sensor and the nearby vehicle detected by a second sensor are the same. The vehicle sets a rectangular gating centered on the position of the track detected by the first sensor, and determines whether the track detected by the second sensor is included in the set gating. Thus, determining whether the nearby vehicle sensed by the first sensor and the nearby vehicle detected by the second sensor are the same. When the track detected by the second sensor is included in the set gating, the vehicle may determine that the nearby vehicle sensed by the first sensor and the nearby vehicle detected by the second sensor are the same. When the track detected by the second sensor is not included in the set gating, the vehicle may determine that the nearby vehicle sensed by the first sensor and the nearby vehicle detected by the second sensor are different from each other.

When the sensing data obtained from the plurality of sensors is the sensing data related to the same nearby vehicle, the vehicle may generate state information of one nearby vehicle by combining the sensing data obtained from the plurality of sensors in step S1114. For example, the vehicle may generate state information of a first nearby vehicle by combining the sensing data obtained from the first sensor and the sensing data obtained from the second sensor.

When the sensed data obtained from the plurality of sensors is not the sensing data related to the same nearby vehicle, the vehicle may determine the sensing data of each respective sensor of the plurality of sensors as state information of different nearby vehicles in step S1116. For example, the sensing data obtained from the camera may be determined as state information of the first nearby vehicle, and the sensing data obtained from the LIDAR may be determined as state information of the second nearby vehicle.

In step S1118, the vehicle may calculate the degree of collision risk of the nearby vehicle based on the state information of the nearby vehicle. According to an embodiment, the vehicle may calculate the degree of collision risk of the nearby vehicle by using Equations (1)-(7) described herein. For example, the vehicle may calculate the time to collision between the vehicle and the nearby vehicle, and the warning index, as shown in Equations (1)-(4), based on the state information of the nearby vehicle. The vehicle may calculate the longitudinal collision risk index as shown in Equation (5) based on the time to collision and the warning index. The vehicle may calculate the time to lane crossing as shown in Equation (6) based on the state information of the nearby vehicle, and may calculate the lateral collision risk index as shown in Equation (7) based on the longitudinal collision risk index and the time to lane crossing. The degree of collision risk of the nearby vehicle may include the longitudinal collision risk index and/or the lateral collision risk index.

The vehicle may determine whether the nearby vehicle is positioned within the region of interest (ROI) in step S1120. For example, the vehicle may determine whether the nearby vehicle is positioned within the ROI based on the position information included in the state information of the nearby vehicle.

When the nearby vehicle is positioned within the ROI, the vehicle may generate a top view image based on the state information and the degree of collision risk of the nearby vehicle in step S1122. For example, as shown in a first column 1210 of FIG. 12, when a nearby vehicle 1201 is present in front of and/or on the left of the vehicle 100, the vehicle may generate top view images 1221, 1222, 1223, and 1224 shown in a second column 1220 of FIG. 12 and/or top view images 1231, 1232, 1233, and 1234 shown in a third column 1230 of FIG. 12. The vehicle may generate the top view images 1221-1224 and 1231-1234 based on the state information and/or the degree of collision risk of the nearby vehicle. The top view images 1221, 1222, 1223, and 1224 in the second column 1220 include only trajectories (moving paths) of the nearby vehicles. Additionally, the top view images 1231, 1232, 1233, and 1234 in the third column 1230 may include a trajectory of the nearby vehicle, geometric information (e.g., shape, size, position, angle, and the like) of the vehicle and the nearby vehicle, and information on the normalized degree of collision risk.

The vehicle may predict the collision mode by using the top view image based on the CNN in step S1124. According to an embodiment, a CNN 1303 may receive a plurality of top view images as an input 1301 as shown in FIG. 13, and may output (1305) a collision mode that indicates whether a collision occurs in the plurality of top view images and a predicted collision portion.

In the above description, the vehicle may generate only one top view image and input it into the CNN. However, the vehicle may generate a plurality of top view images and input them into the CNN in order to increase the accuracy for the collision mode determination. For example, the top view image 1222 of a second row and the top view image 1223 of a third row among the top view images 1221, 1222, and 1223 of the second column 1220 of FIG. 12 are related to a case where the predicted collision portions are different. However, the shapes and the lengths of the trajectories are similar, so there is a possibility that the vehicle may erroneously determine the collision modes as being the same collision mode. Accordingly, in various embodiments of the present disclosure, in order to increase the accuracy of the collision mode determination, as shown in the third column 1230 of FIG. 12, the vehicle may generate the top view images 1231, 1232, 1233, and 1234 including not only the trajectory indicating the moving path of the nearby vehicle but also the geometric information of the vehicle and the nearby vehicle and the information on the normalized degree of collision risk. Additionally, the information may be used as an input for the CNN.

As described above, the vehicle, according to various embodiments of the present disclosure, may generate the top view image based on the occupancy grid map by using the state information of the nearby vehicle. The vehicle may also determine whether the vehicle collides and the collision mode that indicates a predicted collision portion through the trained CNN based on the generated top view image. Based on the determined collision mode, the vehicle establishes a more sophisticated collision avoidance strategy before the collision actually occurs, thereby minimizing the degree of risk of collision. In addition, the vehicle actively controls, in advance, the time of deployment of a passive safety system such as a seat belt pre-tensioner that is a passenger restraint device or an airbag in accordance with the determined collision mode, thereby minimizing the injury of the passenger.

REFERENCE NUMERALS

| | |
|---|---|
| 100: Vehicle | 110: Sensor Unit |
| 120: Processor | 130: Warning Unit |
| 140: Storage Unit | 150: Display |
| 160: Controller | 170: Communication Device |

What is claimed is:

1. A vehicle comprising:
   a plurality of sensors configured to obtain state information on a nearby vehicle; and
   a processor that is operatively connected to the plurality of sensors,
   wherein the processor is configured to:
      determine a degree of collision risk, comprising a longitudinal collision risk index, between the vehicle and the nearby vehicle based on the state information on the nearby vehicle;
      generate a top view image including the state information and the degree of collision risk;
      determine a collision mode, which indicates whether the vehicle collides with the nearby vehicle and a predicted collision portion through an artificial neural network model using the top view image as an input; and
      control the vehicle to perform a collision avoidance function based on the collision mode,
   wherein the processor is configured to:
      determine the longitudinal collision risk index based on a time to collision between the vehicle and the nearby vehicle and a warning index to determine the degree of collision risk, and
   wherein the warning index is determined based on a moving distance, determined based on a deceleration and a reaction time, until the vehicle comes to a stop.

2. The vehicle of claim 1,
   wherein the top view image represents at least one of a moving path of the nearby vehicle, a position of the nearby vehicle, an angle of the nearby vehicle, a position of the vehicle, an angle of the vehicle, and the degree of collision risk between the vehicle and the nearby vehicle.

3. The vehicle of claim 1,
   wherein the degree of collision risk between the vehicle and the nearby vehicle further comprises a lateral collision risk index.

4. The vehicle of claim 3,
   wherein the processor is configured to:
      determine the lateral collision risk index based on the longitudinal collision risk index and a time to lane crossing,
   wherein the time to collision is determined based on a longitudinal distance between the vehicle and the nearby vehicle and a relative longitudinal speed of the nearby vehicle,
   wherein the warning index is determined based on a distance between the vehicle and a nearby vehicle, the moving distance until the vehicle comes to a stop when the vehicle performs a uniformly accelerated motion at a maximum deceleration, and the reaction time of a driver, and
   wherein the time to lane crossing is determined based on a relative speed and a relative lateral position of the nearby vehicle.

5. The vehicle of claim 1,
   wherein the processor is configured to:
      check whether the plurality of sensors detect the same nearby vehicle, and
      when the plurality of sensors detect the same nearby vehicle, combine pieces of the state information obtained from the plurality of sensors and manage the combined information as state information of one nearby vehicle.

6. The vehicle of claim 1,
wherein the processor is configured to control the nearby vehicle to be represented within the top view image in grayscale which corresponds to the degree of collision risk.

7. The vehicle of claim 1,
wherein the processor is configured to:
    check whether the nearby vehicle is positioned within a region of interest, and
    when the nearby vehicle is positioned within the region of interest, generate the top view image and determine the collision mode.

8. The vehicle of claim 1,
wherein the artificial neural network model is a pretrained convolutional neural network (CNN) model that receives the top view image and determines the collision mode for the nearby vehicle.

9. The vehicle of claim 1,
wherein the state information comprises at least one of a position, an angle, a size, a shape, a distance, or a relative speed of the nearby vehicle.

10. A method of predicting collision for a vehicle, the method comprising:
    obtaining state information on a nearby vehicle by using a plurality of sensors;
    determining a degree of collision risk, comprising a longitudinal collision risk index, between the vehicle and the nearby vehicle based on the state information on the nearby vehicle;
    generating a top view image based on including information and the degree of collision risk;
    determining a collision mode through an artificial neural network model using the top view image as an input; and
    controlling the vehicle to perform a collision avoidance function based on the collision mode,
    wherein the collision mode indicates whether the vehicle collides with the nearby vehicle and a predicted collision portion through an artificial neural network model using the top view image as an input,
    wherein determining the degree of collision risk includes:
        determining the longitudinal collision risk index based on a time to collision between the vehicle and the nearby vehicle and a warning index, and
    wherein the warning index is determined based on a moving distance, determined based on a deceleration and a reaction time, until the vehicle comes to a stop.

11. The method of claim 10,
wherein the top view image represents at least one of a moving path of the nearby vehicle, a position of the nearby vehicle, an angle of the nearby vehicle, a position of the vehicle, an angle of the vehicle, or the degree of collision risk between the vehicle and the nearby vehicle.

12. The method of claim 10,
wherein the degree of collision risk between the vehicle and the nearby vehicle further comprises a lateral collision risk index.

13. The method of claim 12,
wherein determining the degree of risk of collision comprises:
    determining the lateral collision risk index based on the longitudinal collision risk index and a time to lane crossing,
wherein the time to collision is determined based on a longitudinal distance between the vehicle and the nearby vehicle and a relative longitudinal speed of the nearby vehicle,
wherein the warning index is determined based on a distance between the vehicle and a nearby vehicle, the moving distance until the vehicle comes to a stop when the vehicle performs a uniformly accelerated motion at a maximum deceleration, and the reaction time of a driver, and
wherein the time to lane crossing is determined based on a relative speed and a relative lateral position of the nearby vehicle.

14. The method of claim 10,
wherein obtaining the state information on the nearby vehicle comprises:
    checking whether the plurality of sensors detect the same nearby vehicle, and
    when the plurality of sensors detect the same nearby vehicle, combining pieces of the state information obtained from the plurality of sensors and managing the combined information as state information of one nearby vehicle.

15. The method of claim 10,
wherein generating the top view image comprises controlling the nearby vehicle to be represented within the top view image in grayscale which corresponds to the degree of collision risk.

16. The method of claim 10, further comprising:
checking whether the nearby vehicle is positioned within a region of interest, and
generating the top view image and determining the collision mode when the nearby vehicle is positioned within the region of interest.

17. The method of claim 10,
wherein determining the collision mode through the artificial neural network model comprises determining the collision mode through a pre-trained convolutional neural network (CNN) model that receives the top view image and determines the collision mode for the nearby vehicle.

18. The method of claim 10,
wherein the state information on the nearby vehicle comprises at least one of a position, an angle, a size, a shape, a distance, or a relative speed of the nearby vehicle.

* * * * *